US006343311B1

(12) United States Patent
Nishida et al.

(10) Patent No.: US 6,343,311 B1
(45) Date of Patent: *Jan. 29, 2002

(54) METHODS, SYSTEMS AND COMPUTER PROGRAM PRODUCTS FOR REMOTE CONTROL OF A PROCESSING SYSTEM

(75) Inventors: Noriko Nishida; Kenichi Satoh; Masahiro Shioya, all of Kanagawa-ken (JP)

(73) Assignee: International Business Machines Corporation, Armonk, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/084,151

(22) Filed: May 26, 1998

(30) Foreign Application Priority Data

May 27, 1997 (JP) .............................................. 9-136232

(51) Int. Cl.[7] ............................................ G06F 15/173
(52) U.S. Cl. ...................... 709/203; 709/206; 709/225; 714/48
(58) Field of Search ................................ 709/203, 206, 709/224, 226; 714/48; 379/220, 265; 358/434; 707/4, 10

(56) References Cited

U.S. PATENT DOCUMENTS

| | | | | |
|---|---|---|---|---|
| 5,481,698 A | * | 1/1996 | Itoh | 714/48 |
| 5,603,031 A | | 2/1997 | White et al. | 709/317 |
| 5,632,018 A | * | 5/1997 | Otorii | 709/206 |
| 5,715,393 A | * | 2/1998 | Naugh | 709/224 |
| 5,764,899 A | * | 6/1998 | Eggleston | 709/203 |
| 5,920,404 A | * | 7/1999 | Weiser | 358/434 |
| 5,923,745 A | * | 7/1999 | Hurd | 379/220 |
| 5,946,386 A | * | 8/1999 | Rogers | 379/265 |
| 5,978,799 A | * | 11/1999 | Hirsch | 707/4 |
| 6,112,242 A | * | 8/2000 | Jois et al. | 709/225 |

FOREIGN PATENT DOCUMENTS

JP             09022348             1/1997

OTHER PUBLICATIONS

Sumi Kin and Takao Iwasaki. "An application of JAVA language to an agent system." *National Conference of Information Processing Scientific Society*. pp. 4–243–4–244.
Abstract of Japanese Patent JP7182174 for System and Method for Distributed Computation Based Upon the Movement, Execution, and Interaction of Processes in a Network, Jan. 19, 1995.
Abstract of Japanese Patent JP9022348 for Program Preparing Method and Program Managing Method, Jan 21, 1997.
Abstract of Japanese Patent No. JP7509799 for System and Method for Distributed Computation Based Upon the Movement, Execution, and Interaction of Processes in a Network, Jan. 18, 1995.
IBM Japan, Ltd., *Mobile Computer Agent*, V J1.1, pp. 1–1 through 1–10 and 15–1 through 15–8 (Oct. 1996).

* cited by examiner

*Primary Examiner*—Ayaz Sheikh
*Assistant Examiner*—Khanh Quang Dinh
(74) *Attorney, Agent, or Firm*—Myers Bigel Sibley & Sajovec; A. Bruce Clay

(57) ABSTRACT

Methods, systems and computer program products are provided for remote control of a processing system by receiving a generic message from a message source and extracting from the generic message a source and instructions describing the control of the remote processing system. The remote processing system is the controlled in a manner specified by the instructions extracted from the generic message so as to provide processing results. A generic message containing the processing results may then be generated and transmitted to the source of the generic message. Preferably, the generic message is an e-mail message.

49 Claims, 9 Drawing Sheets

| User registration |
|---|

User ID

- ASP01
- ASP03

Add (A)
Change (C)
Delete (D)

Alias

Mail destination phone #

OK    Help (H)

| User addition |
|---|

| User name | ASP01 |
| Alias | PROXY2 |
| Mail destination phone # | 050-123-4567 |
| Mail Destination password | ****** |

OK    Cancel    Help (H)

METHODS, SYSTEMS AND COMPUTER PROGRAM PRODUCTS FOR REMOTE CONTROL OF A PROCESSING SYSTEM

FIELD OF THE INVENTION

The present invention relates to an information handling method, and in particular to a method for controlling a server at a remote location, or a method for receiving results obtained by processing performed by a server at a remote location.

BACKGROUND OF THE INVENTION

Conventionally, when remote control is to be exercised to use a resource at a remote location, special remote control software is installed in advance both in the machine to be remote controlled and in the machine to exercise the remote control. Many of the remote control machines that are currently available are designed for operation in a variety of hardware and software environments, and some machines are operated by hardware or an operating system (OS) that has restrictions. Therefore, a great expenditure of effort is required to develop remote control software and to install it on all these machines.

In addition, since the same software versions are typically installed on remote controlled machines and on those that exercise the remote control, a great expenditure of effort is also required to manage these machines. For example, before installing an upgrade version, the versions on all the remote controlling machines should be examined. If remote control software is developed for specific platforms, the types of machines to be remote controlled may be limited. Furthermore, the multi-platform operations which users may demand may not be capable of implementation. When special remote control software is routinely installed in remotely controlled machines, a certain amount of memory is typically permanently allocated for its storage. This allocation of memory may constitute a performance barrier, particularly to the downsizing of portable remotely controlled machines.

The above conventional problems may also occur in agent implementations disclosed in "Mobile Computer Agent Version J1.1, Third Edition, published by IBM Japan, Ltd. in October 1996 (SC88-3162-00)" and Japanese Unexamined Patent Publication Nos. Hei 7-182174 and Hei 7-509799.

A technique involving requesting a remote server to perform processing and then obtaining the processing result, is described in Japanese Unexamined Patent Publication No. Hei 9-22348 and "Mobile Computer Agent Version J1.1, Third Edition, published by IBM Japan, Ltd. in October 1996 (SC88-3162-00), pp. 1–4 to 1–10 and pp. 15–1 to 15–8." These documents disclose a technique whereby, as is shown in FIG. 13, a mobile agent, which holds information for designating a set of procedures to be executed by a server, is sent by a terminal to a server, which in turn executes procedures stored in advance according to the designated information.

The above technique typically requires a terminal having the capacity to prepare a file in the proper format, and also typically requires the installation of special software in the terminal. However, because a portable information terminal (a smart phone or a Personal Data Assistant (PDA)), which is a phone that provides an e-mail function and a simple input function, such as is performed with a numerical key pad and a set of function keys, is typically incapable of file preparation and handling, and because its storage area and input means are restricted, sending a request for the performance of complicated processing to a server from such a terminal is difficult, if not impossible. Furthermore, even a terminal that has an abundance of resources requires special software.

SUMMARY OF THE INVENTION

It is, therefore, one object of the present invention to provide a computer system that can control a program to be executed by a server, even when special remote control software is not available at a remote control terminal.

It is another object of the present invention to provide a computer system that, while not requiring special software, can obtain processing results from a remote controlled server.

It is an additional object of the present invention to provide a computer system that can remotely control a server even when the memory capacity of a remote control terminal is small.

It is a further object of the present invention to provide a computer system that can remotely control a server even when a remote control terminal cannot prepare and handle a file.

It is still another object of the present invention to provide a remote control system whose employment is not dependent on the platform of the remote control terminal.

It is a still further object of the present invention to reduce the input required by a remote control terminal for the exercise of the remote control function.

It is yet another object of the present invention to provide a fast remote control system that reduces the quantity of data exchanged between a remote control terminal and a remotely controlled server during a remote control operation.

It is yet one further object of the present invention to provide a remote control system that can dynamically alter a remote control process currently desired by a user and execute it.

These and other objects of the present invention are provided by methods, systems and computer program products for remote control of a processing system by receiving a generic message from a message source and extracting from the generic message a source and instructions describing the control of the remote processing system. The remote processing system is the controlled in a manner specified by the instructions extracted from the generic message so as to provide processing results. A generic message containing the processing results may then be generated and transmitted to the source of the generic message. Preferably, the generic message is an e-mail message.

By utilizing a generic message to provide remote control of a processing system, the present invention allows for control of the processing system by any user with the capability of generating the generic message. Thus, no special software is required to perform the remote control function. For example, according to the present invention any system which can generate an e-mail could remotely control another processing system which was implementing the present invention. By utilizing a message which may be readily generated by a remote user with existing hardware and software the present invention allows for remote control without increasing the processing or memory requirements of the remote user's system.

In a further embodiment of the present invention, the header information of the e-mail is analyzed to extract the source of the e-mail. A body portion of the e-mail is also analyzed to extract keywords and parameters describing the control of the remote processing system. Furthermore, the generic message containing the processing results may also be an e-mail. In such a case, an e-mail containing the processing results is generated and transmitted to the source of the generic message.

In a particular embodiment of the present invention, the processing system is controlled by generating a mobile agent according to the extracted instructions and executing the mobile agent to obtain the processing results. Furthermore, the instructions may be in the form of an agent template specification and agent template change information. In such an embodiment, the mobile agent may be generated by selecting an agent generation template based on the agent template specification information extracted from the message and modifying the selected agent generation template based on the agent template change information extracted from the message so as to provide a modified agent generation template. The mobile agent is then generated according to the modified agent generation template. The mobile agent may also be transmitted to an agent server associated with the mobile agent and the results of the execution of the mobile agent received from the agent server to provide the processing results.

In an alternative embodiment of the present invention, the generic message may be a voice message. In such a case, voice recognition software may be utilized to recognize information in the voice message from which the source of the message and the instructions describing the control of the remote processing system may be extracted. A voice message containing the processing results may also be generated and transmitted to the source of the generic message.

In another embodiment of the present invention, the generic message comprises a facsimile message. In such an embodiment, optical character recognition software may be utilized to recognize information in the facsimile message from which the source of the message and the instructions describing the control of the remote processing system may be extracted. A facsimile message containing the processing results may also be generated and transmitted to the source of the generic message.

As will further be appreciated by those of skill in the art, the present invention may be embodied as a method, apparatus or computer program product.

BRIEF DESCRIPTION OF THE DRAWINGS

FIG. 9 is a diagram showing a user interface for user registration according to the embodiment of the present invention.

FIG. 10 is a diagram showing another user interface for user registration according to the embodiment of the present invention.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

The present invention will now be described with respect to flow diagrams and flowcharts illustrating a system utilizing the present invention. It will be understood that each block of the flowchart and flow diagram illustrations, and combinations of blocks in the flowchart and flow diagram illustrations, can be implemented by computer program instructions. These program instructions may be provided to a processor to produce a machine, such that the instructions which execute on the processor create means for implementing the functions specified in the flowchart or flow diagram block or blocks. The computer program instructions may be executed by a processor to cause a series of operational steps to be performed by the processor to produce a computer implemented process such that the instructions which execute on the processor provide steps for implementing the functions specified in the flowchart or flow diagram block or blocks.

Accordingly, blocks of the flowchart or flow diagram illustrations support combinations of means for performing the specified functions, combinations of steps for performing the specified functions and program instruction means for performing the specified functions. It will also be understood that each block of the flowchart or flow diagram illustrations, and combinations of blocks in the flowchart or flow diagram illustrations, can be implemented by special purpose hardware-based systems which perform the specified functions or steps, or combinations of special purpose hardware and computer instructions. Accordingly, the present invention may take the form of an entirely hardware implementation, an entirely software implementation, or a combination of hardware and software.

Figure 1:
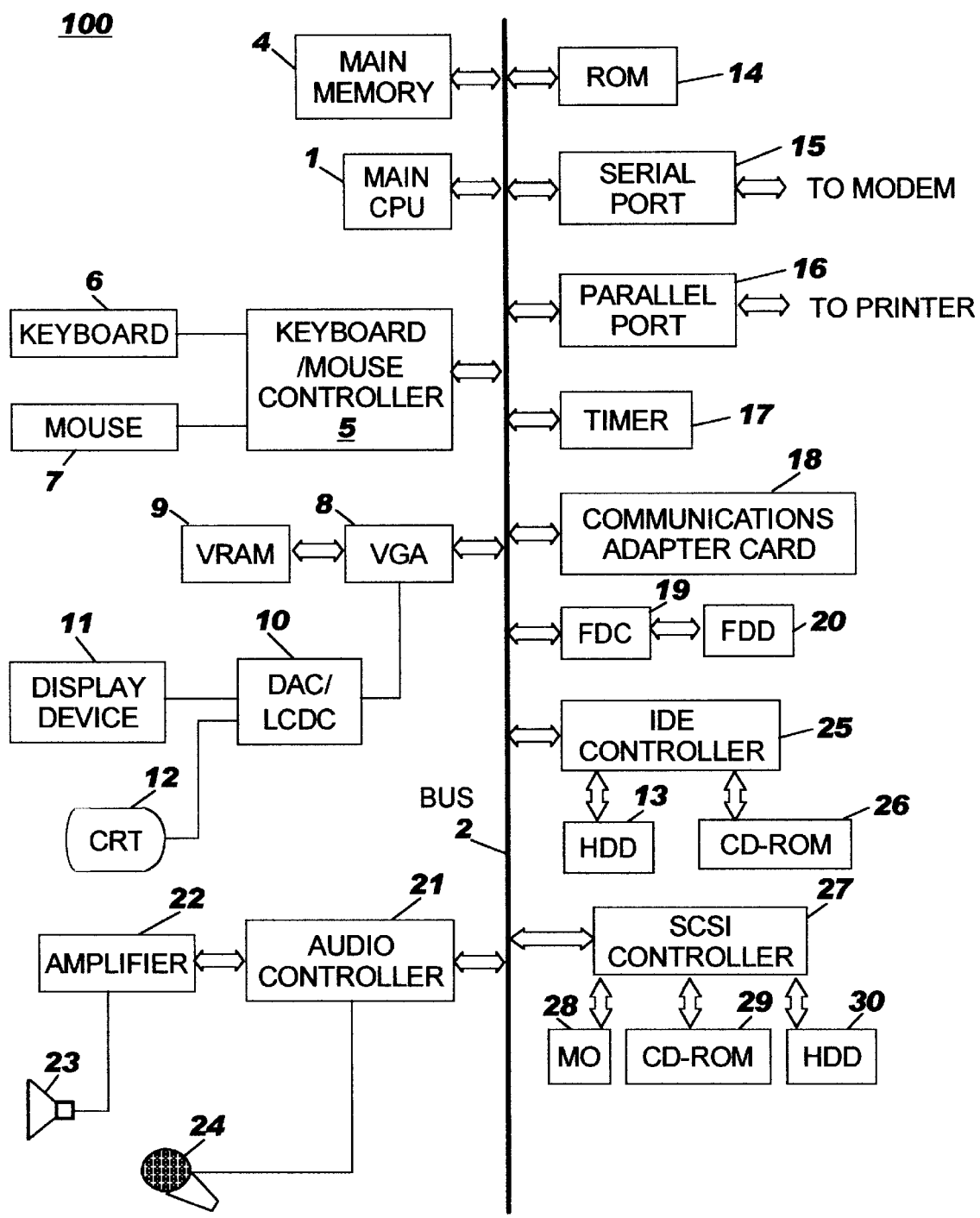
FIG. 1 is a block diagram illustrating one example hardware arrangement for a remote controlled machine or a slave server according to the present invention.

The preferred embodiment of the present invention will now be described while referring to the accompanying drawings. FIG. 1 is a schematic diagram illustrating one examplary hardware arrangement of a remote controlled machine (a slave server) that is employed for the present invention. A slave server 100 includes a central processing unit (CPU) 1 and a memory 4. The CPU 1 and the memory 4 are connected via a bus 2 to a hard disk drive 13 that is an auxiliary storage device. A floppy disk drive (or a memory medium driver, such as an MO and a CD-ROM) 20 is connected via a floppy disk controller 19 (an IDE controller or a SCSI controller) to the bus 2.

A floppy disk (or a memory medium, such as an MO or a CD-ROM) is inserted into the floppy disk drive (or into a memory medium driver, such as one for an MO or a CD-ROM disk) 20. Code for a computer program can be recorded on the floppy disk or the hard disk drive 13, or in a ROM 14, so that the computer program interacts with an operating system and provides commands for the CPU 1 to accomplish the present invention. This computer program is loaded into the memory 4 and is executed. The computer program code can also be compressed, or can be divided into a plurality of segments, and can be recorded on a plurality of media.

The slave server 100 also has user interface hardware, with which are connected a pointing device (a mouse or a joystick) 7 or a keyboard 6 for data input, and a display 12 for providing visual data for a user. In addition, it is possible to connect a printer via a parallel port 16 and a modem via a serial port 15. The slave server 100 can be connected to a network via the serial port 15 and the modem, or via a communication adaptor 18 (the Ethernet or a Token Ring card), for communicating with another computer.

A voice signal, which is obtained by D/A (digital/analog) conversion of an audio controller 21, is sent via an amplifier 22 to a loudspeaker 23, through which the voice signal is released as sound. The audio controller 21 can perform A/D (analog/digital) conversion of a voice signal received from a microphone 24, and can fetch external audio data into the system.

As is described above, it can be easily understood that the slave server 100 of the present invention may be provided by a communication terminal having a communication function, such as a common personal computer (PC), a workstation, a notebook PC, a palmtop PC or a network computer, or by a combination of such terminals. It should be noted that the above components in FIG. 1 are only examples, and that not all of them are required for the present invention. In particular, the audio controller 21, the amplifier 22, the loudspeaker 23 and the microphone 24, which are required for audio processing; the keyboard 6, the mouse 7 and a keyboard/mouse controller 5, which permit direct input by an operator; the CRT 12, a display device 11, a VRAM 9 and a VGA 8, which provide visual data for a user; and various memory medium processors 19, 25 and 27 are not requisite components.

Various possible modifications of the components of the slave server 100 would be readily apparent to one having ordinary skill in the art. For example, a plurality of machines would be combined and functions could be distributed among these machines for the execution of an operation. These modifications are included in the subject of the invention.

As well as the slave server 100, a remote controlling terminal (a master controller 210 in FIG. 2) used for the present invention can be provided by using the same hardware as is shown in FIG. 1. That is, the master controller 210 needs only be capable of receiving as input input a mail keyword and send it as an e-mail. It can, therefore, be easily understood that the master controller 210 may be provided by a common personal computer (PC), a workstation, a notebook PC, a palmtop PC, an electronic home appliance, such as a television incorporating a computer, a game machine including a communication function, or a communication terminal having a communication function, such as a telephone, a facsimile machine, a portable telephone, a PHS phone or an electronic notebook, or by a combination of such devices.

These hardware components are only examples and not all of them are required for the present invention. In particular, as a smart phone, such as "Datascope" by Kyocera or "Pinocchio" by Panasonic, that has only a telephone and display output function and a communication function for e-mail is used as a master controller, the preferred embodiment of the present invention does not necessarily require the audio controller 21, the amplifier 22, the loudspeaker 23 and the microphone 24, which are required for audio processing; the keyboard 6, the mouse 7 and the keyboard/mouse controller 5, which permit direct input by an operator; the CRT 12, the display device 11, the VRAM 9 and the VGA 8, which provide visual data for a user; and the memory medium processors 19, 25 and 27.

An operating system for the slave server 100 can be: one supporting a GUI multi-window environment as standard, such as Windows NT (trademark of Microsoft Corp.), Windows 95 (trademark of Microsoft Corp.), Windows 3.x (trademark of Microsoft Corp.), OS/2 (trademark of IBM Corp.), MacOS (trademark of Apple Inc.) or the X-WINDOW system (trademark of MIT) on AIX (trademark of IBM); one having a character based environment, such as PC-DOS (trademark of IBM Corp.) or MS-DOS (trademark of Microsoft Corp.); or an OS installed in a network computer, for example, a real time OS such as OS/Open (trademark of IBM Corp.) or VxWorks (trademark of Wind River Systems, Inc.), or JavaOS. In other words, the operating system for the master controller 100 is not limited to a specific operating system environment.

An operating system for the master controller 210 can also be: one supporting a GUI multi-window environment as standard, such as Windows NT (trademark of Microsoft Corp.), Windows 95 (trademark of Microsoft Corp.), Windows 3.x (trademark of Microsoft Corp.), OS/2 (trademark of IBM Corp.), MacOS (trademark of Apple Inc.) or the X-WINDOW system (trademark of MIT) on AIX (trademark of IBM); one having a character based environment, such as PC-DOS (trademark of IBM Corp.) or MS-DOS (trademark of Microsoft Corp.); an OS installed in a network computer, for example, a real time OS such as OS/Open (trademark of IBM Corp.) or VxWorks (trademark of Wind River Systems, Inc.), or JavaOS; or a chip card OS used in "Datascope." In other words, the operating system for the master controller 210 is not limited to a specific operating system environment.

System Configuration

The system configuration in the preferred embodiment of the present invention will now be described while referring to FIG. 2. In this embodiment, a portable information terminal (terminal) 210 acts as a PHS phone or a portable telephone, and can access a server 200 connected to a network 225. In this embodiment, a mail proxy 300 and an agent server 230 are activated on an OS (operating system) 220 of the server 200.

The mail proxy 300 generates a mobile agent 240 from data in an e-mail received from the terminal 210, and sends the mobile agent 240 to the agent server 230. An agent manager 231 in the agent server 230 analyzes the contents of the mobile agent 240. In accordance with the analysis, the agent manager 231 accesses a host computer 260, a Notes server (a trademark of Lotus Corp.) 270, or a home desktop PC 280, and acquires data (e.g., data in a customer database held by the host computer, schedule data for a supervisor or the Internet/Intranet data held by the Notes server, or reference material for a meeting prepared by the home desktop computer).

The agent manager 231 sends the acquired data to the mail proxy 300 in the form of a mobile agent 245. Upon receipt of the mobile agent 245, the mail proxy 300 converts it into an e-mail form, and sends it to the terminal 210.

In the preferred embodiment of the present invention, the mail proxy 300 is added to the current agent processing system to implement the present invention. However, the concept of the present invention is not limited to this application. For example, the present invention can be accomplished by providing the agent manager 231 the function of the mail proxy 300, and by mounting the mail proxy 300 and the agent server 230 on separate machines.

Figure 3:
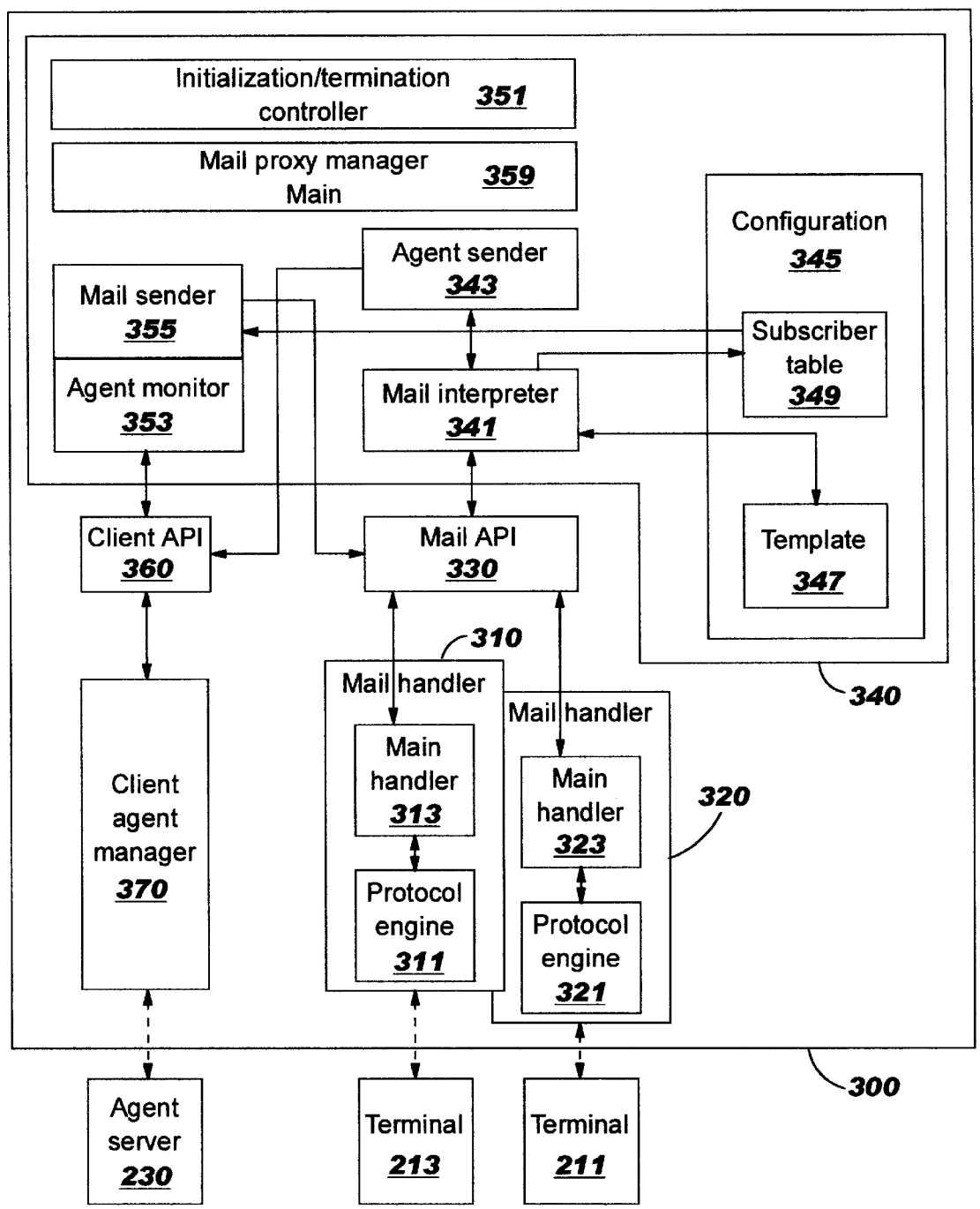
FIG. 3 is a block diagram illustrating the arrangement of a mail proxy according to the preferred embodiment of the present invention.

FIG. 3 is a functional block diagram illustrating the system configuration of the mail proxy 300 in the preferred embodiment of the present invention. In this embodiment, the mail proxy 300 includes mail handlers 310 and 320, a mail API 330, a mail proxy manager 340, a client API 360, and a client agent manager 370.

An initialization/termination controller 351 activates the mail proxy 300, and prepares windows for the mail proxy 300; activates individual components of the mail proxy 300, the client agent manager 370, and the mail handlers 310 and 320; performs a post-process for removing the mail proxy 300; and destroys the windows and the components of the mail proxy 300, the client agent manager 370, and the main handlers 310 and 320 when no longer needed.

Figure 4:
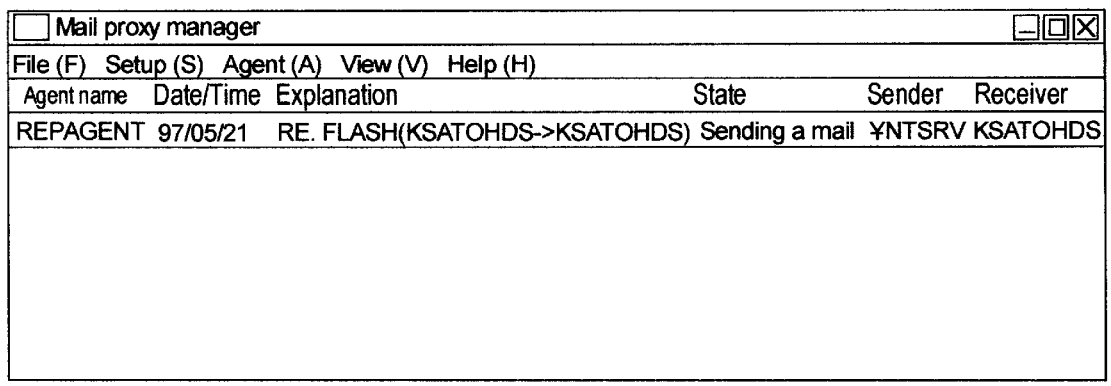
FIG. 4 is a diagram showing a user interface including a mail proxy manager main window according to the embodiment of the present invention.

When the mail proxy 300 is activated and the state of the mobile agent 245 at the mail proxy 300 is changed (when a mobile agent is received, a sending error occurred or an e-mail is being prepared), a mail proxy manager main 359 displays or changes the state in the window of the mail proxy 300, and also provides a user interface. In FIG. 4 is shown a mail proxy manager main window 500. With such an interface for displaying the state of the mobile agent 245, the state of the mobile agent can immediately be understood by a user.

A configuration 345 provides the configuration required by the mail proxy 300. In this embodiment, the following configuration is provided.

Figure 5:
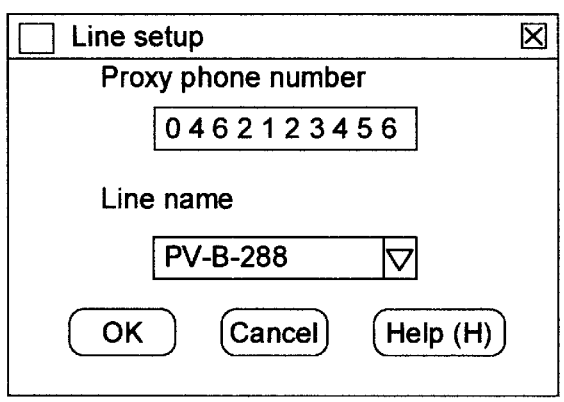
FIG. 5 is a diagram showing a user interface for a line setup according to the embodiment of the present invention.
Figure 6:
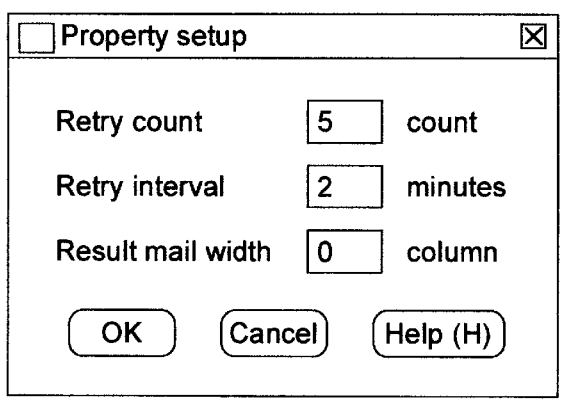
FIG. 6 is a diagram showing a user interface for a property setup according to the embodiment of the present invention.

1. Subscriber table data 349, in which users are registered, is stored for use by the mail proxy 300. In this embodiment, a user ID registered in the agent server 230 is correlated with an alias and an address for sending mail (access information, such as a telephone number or an e-mail address). A user ID registered in the agent server 230 is also correlated with a common password to authenticate terminals 211 and 213.
2. A template 347 is stored for use by the mail proxy 300.
3. A modem and modem properties can also be included in the configuration (for example, the settings for a modem shown in FIGS. 5 and 6, and setup options, such as the number of retries when mail is sent by the mail proxy 300).

A mail interpreter 341 analyzes an agent mail keyword written in the body of an e-mail, and generates a new template by changing or adding to the template 347. In one embodiment of the present invention, the agent generation template is employed to generate a mobile agent. However, in the mode where the mail keyword of the e-mail is used to change the attributes of a program to be executed in the server 200, the template is not employed; and based on the analyzed mail keyword, source code for the program in the server 200 can be updated to generate an execution module, or the execution module can be updated directly.

Based on the new template received from the mail interpreter 341, an agent sender 343 specifies a program registered in advance, and updates the contents of the program. This program may be either a common program executed in the server 200, or a program for generating a mobile agent that acquires data from another site on the network.

When the agent generation program is designated, the agent sender 343 employs a new template received from the mail interpreter 341, and prepares a mobile agent by using a client API 360.

An agent monitor 353 uses the client API 360 to periodically examine the queue of a client agent manager 370 to determine whether or not a mobile agent is present.

A mail sender 355 extracts, from a mobile agent, data that includes the results of processing and the results obtained by the execution of a common program that serves as the body of an e-mail. Data indicating the address to which processing results are to be sent is sent to the mail handlers 310 and 320.

The mail handlers 310 and 320 include main handlers 313 and 323, and protocol engines 311 and 321. The protocol engines 311 and 321 analyze and process the protocol for mail sent by the terminal, and later, recovers it as an e-mail. Specifically, a set of data received via a communication line is analyzed and processed according to the protocol. Then, the set of data is recovered in the form of an e-mail and a file is generated.

The protocol engines 311 and 321 transmit notification of the arrival of an e-mail to the main handlers 313 and 323. The main handlers 313 and 323 extract the body portion and sender information of the e-mail received at the mail proxy 300, and send the body portion and the sender information via the mail API 330 to the mail interpreter 341. The main handlers 313 and 323 also prepare an e-mail using the body portion and the destination information corresponding to the process results, and send the e-mail to the designated address.

In the preferred embodiment of the present invention, a plurality of mail handlers 310 and 320 can be operated in parallel, and the mail API 330 absorbs the timing differences between the mail handlers when they are operated in parallel.

The client agent manager 370 processes a request from a client API, sends a mobile agent to a designated location, and obtains the results of processing.

Figure 2:
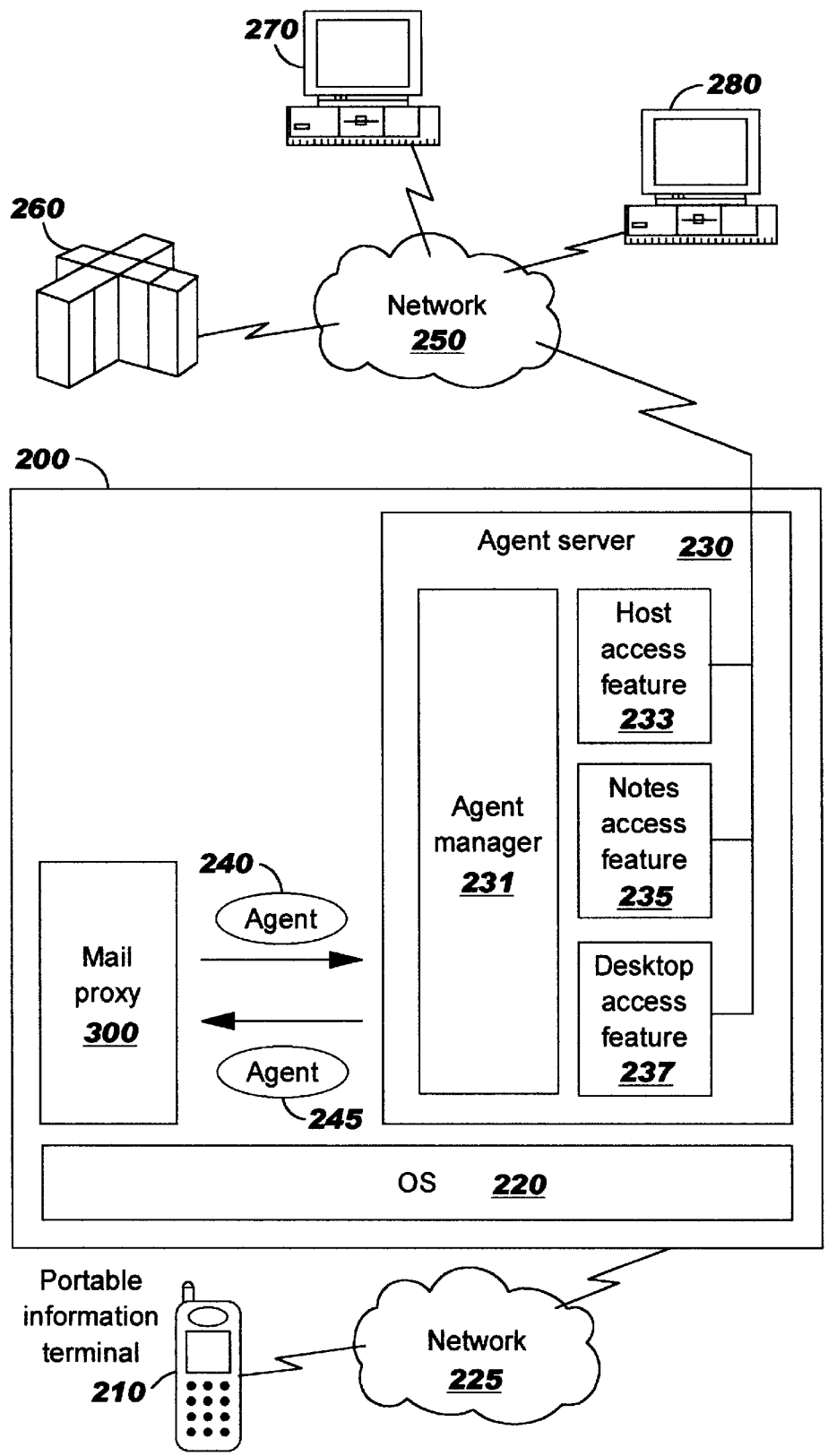
FIG. 2 is a diagram illustrating an example operating state of the present invention.

Although the functional blocks in FIGS. 2 and 3 have been explained, these functional blocks are logical, and are not meant to be constituted by a set of hardware or software components, but can be constituted by compounded or common hardware and software components. Not all the functional blocks in FIGS. 2 and 3 are required for the present invention. For example, if authentication of a sender is not performed, the subscriber table 349 is not required, and if an API for facilitating the exchange of an e-mail is provided to support Internet mail, the protocol engines 311 and 321 are not required.

While the arrangement in FIG. 3 allows for the execution of a program for generating a mobile agent in the slave server 200. So long as the arrangement is one where an application program that is completed at the slave server 200 is executed, the agent sender 343, the agent monitor 353, the client API 360 and the client agent manager 370 may not be required.

Preprocess Operations

The preprocess operations for performing the preferred embodiment of the present invention will now be described.

Preparation and Registration of Template

A template is prepared and registered as a preprocess for performing the method of the present invention. First, a template is prepared by using a text editor. In the preferred embodiment of the present invention, the template is a conversion file that changes a pattern program stored in the server 200, and then executes the program. In this embodiment, an explanation will be given for an agent preparation program. Table 1 shows an example template for the preferred embodiment of the present invention.

TABLE 1

Figure 7:
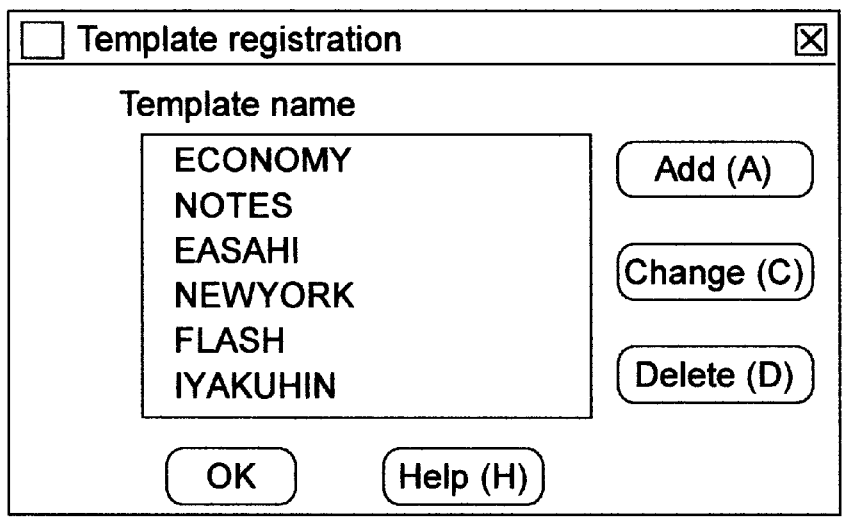
FIG. 7 is a diagram showing a user interface for a template registration according to the embodiment of the present invention.
Figure 8:
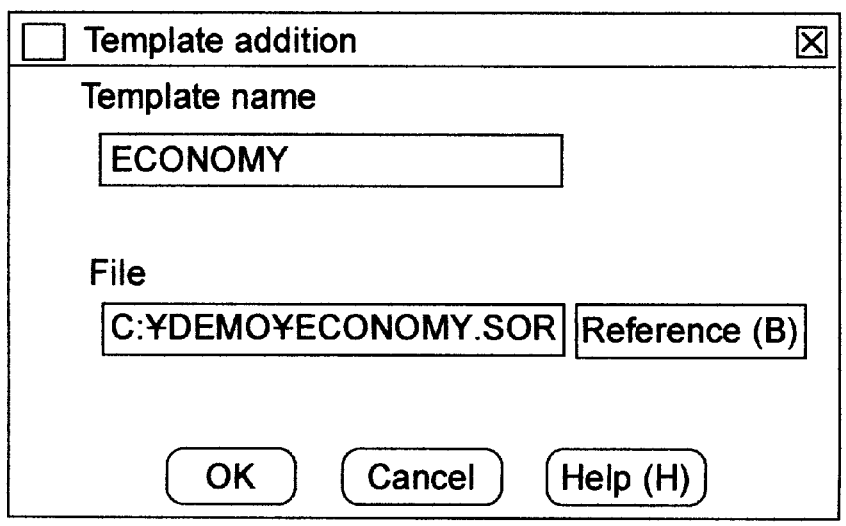
FIG. 8 is a diagram showing another user interface for a template registration according to the embodiment of the present invention.

Name=Agent1
Feature=HostACC
Program=g:\mail\sendmail.exe
ProgramType=W32EXE
ProgramLocation=REMOTE
ProgramArgs=JL07457
ResultHandling=NONE
Capability=<host1t1>
ReplyReceiverID=OS2CLN The prepared template is registered in the mail proxy 300. In the preferred embodiment of the present invention, a user interface shown in FIGS. 7 and 8 is provided and can be registered in the following manner.

First, Setup is selected from a menu bar on a mail proxy main screen 500 (FIG. 4), and template registration is selected. Next, Add is selected on a screen 630 in FIG. 7 for registering a template. Then, when a template addition screen 650 in FIG. 8 is displayed, the name of a template is entered in a template name box, and a file name is entered in a file name box by using a path to the location of the prepared template. An OK button is selected to validate the data entered.

Preparation of Mail Keyword

The terminals 211 and 213 prepare e-mail by using agent mail keywords, and send the e-mail to the mail proxy 300. The mail proxy 300 employs the agent mail keywords to generate a mobile agent 240 and sends it to the agent server 230. The keywords constitute the contents of the mobile agent. Examples of the agent mail keywords in this embodiment are shown in Table 2.

TABLE 2

TEMPLATE = "SENDMAIL"
DEST=SRV
ARGS=JL03320
RESULT=AUTO
RECEIVER=PROXY1

In the preferred embodiment of the present invention, "#template" is used either to designate the name of a template registered in the mail proxy 300, or to directly designate a file name for the template and a path to the file in the mail proxy 300. For example, when a template name is registered in the mail proxy 300, "#template="getmail"" is designated. To directly designate a file name of a template, "#template=c:\nag\getmail.src" is designated.

"#dest" is used to designate an agent server name or the name of a capability. When a server name is designated, "#dest=SERVER" is designated. When a capability is designated, "#dest=<capa1>" is designated.

"#args" is used to set an argument in a user program as needed. In this case, "#args=arg1 arg2 arg3" is designated.

"#result" is used to designate how the resultant mobile agent is to be processed in the agent server 230. In this embodiment, when this keyword is not designated and when nothing is designated in resulthandling in the file of the template designated by #template, the mobile agent is automatically returned. For example, "#result=auto" is designated for an automatic return, "#result=keep" is designated for holding the results at the agent server 230, and "#result=none" is designated for abandoning the results at the agent server 230.

"#receiver" is used when the resultant agent is sent to another user. In this case, "#receiver=OS2CLN (client name registered in the agent server 230) is designated.

In the preferred embodiment of the present invention, the following keywords are provided in addition to those shown in Table 2.

"#fax" is used to designate a FAX number when the results of the mobile agent is output through the facsimile. For example, "#fax=03-1234-5678" is designated.

"#deliver" is a keyword for designating a FAX cover page. The keyword is used together with #FAX. In this embodiment, the names of a path and a file are designated as "#deliver=c:\fax\cover.txt."

When keyword "#file and #efile" is designated, a data file used by a program that is executed by a mobile agent is prepared at the mail proxy 300 and is sent as a mobile agent to the server. The contents written between #file and #efile are written in the data file.

In the preferred embodiment of the present invention, the designation shown in Table 3 is possible.

TABLE 3 file=A.TXT
roger
efile

"#file=A.TXT" is the name of a data file prepared by the mail proxy 300, "roger" is a character string to be written out, and "#efile" indicates the termination of the contents to be written.

"#get" is designated to acquire an e-mail present in the mail proxy 300 or a mobile agent present in the agent server 230. In this embodiment, "#get=mail" is designated to acquire an e-mail present in the mail proxy 300, while the designation shown in Table 4 is performed to acquire a mobile agent present in the agent server 230.

TABLE 4 get=agent srv
get=agent <3270>

"#get=agent srv" is used to designate a server name. "#get=agent <3270>" designates a capability that a server must have to perform the function.

In this embodiment, when an agent mail keyword differs from the contents of a template, the one that is designated later is given priority. Since the mail keyword is satisfactory so long as the mail proxy 300 can specify the type of mail by using the mail keyword, the mail keyword may be a simple numeral or symbol. In addition, the mail keyword can be converted by the mail proxy 300 for easier processing.

Sending of e-mail

Assume that in the following example, the setup is performed as follows.

(a) A client name, set when the mail proxy 300 is installed, is MAIPROXY.

(b) The setup shown in Table 5 is performed to configure the system of the agent server 230.

TABLE 5

| Alias for MAIPROXY | User name | User's password |
|---|---|---|
| PROXY1 | DSP01 | DSPPASS1 |
| PROXY2 | DSP02 | DSPPASS2 |
| PROXY3 | DSP03 | DSPPASS3 |

(c) For registration of a user in the mail proxy, a user registration is correlated, as is shown in Table 6, with the setup of the system configuration for the agent server 230. In this embodiment, for user registration a user interface in FIGS. 9 and 10 is provided, and with this, a user can easily register himself or herself.

TABLE 6

| User ID | Alias | Phone Number | Password |
|---|---|---|---|
| DSP01 | PROXY2 | 050-123-4567 | DSPPASS1 |
| DSP03 | PROXY1 | 010-234-5678 | DSPPASS3 |

(d) The phone number of the mail proxy 300 is 0462-12-3456.

(e) Two terminals are provided, and an e-mail including an agent mail keyword describing the contents of a mobile agent is sent from one terminal. The resultant e-mail is received at the other terminal. The phone number of the sending terminal is 050-123-4567 and its password is DSPPASS1, while the phone number of the receiving terminal is 050-234-5678 and its password is DSPPASS3.

(1) First, an e-mail including an agent mail keyword is sent from terminal 1. To obtain the result at terminal 2 (the phone number of which is 050-234-5678) an e-mail shown in Table 7 below is prepared.

TABLE 7

From: 050-123-4567
To: 0462-12-3456
Date: 1997/04/xx
Sub: Test
TEPLATE="SENDMAIL"
DEST=SRV
ARGS=JL03320
RESULT=AUTO
RECEIVER=PROXY1

"From: 050-123-4567" is the phone number of the sender, "To: 0462-12-3456" is the phone number of the mail proxy 300, "#TEMPLATE="SENDMAIL"" is the template name, "#DEST=SRV" is the agent server name, "#ARGS= JL03320" is an argument for a user program, "#RESULT= AUTO" is a method for processing the results, and "#RECEIVER=PROXY1" is an alias for the receiver of the results registered in the mail proxy 300.

Generation and Sending of Object

Figure 11:
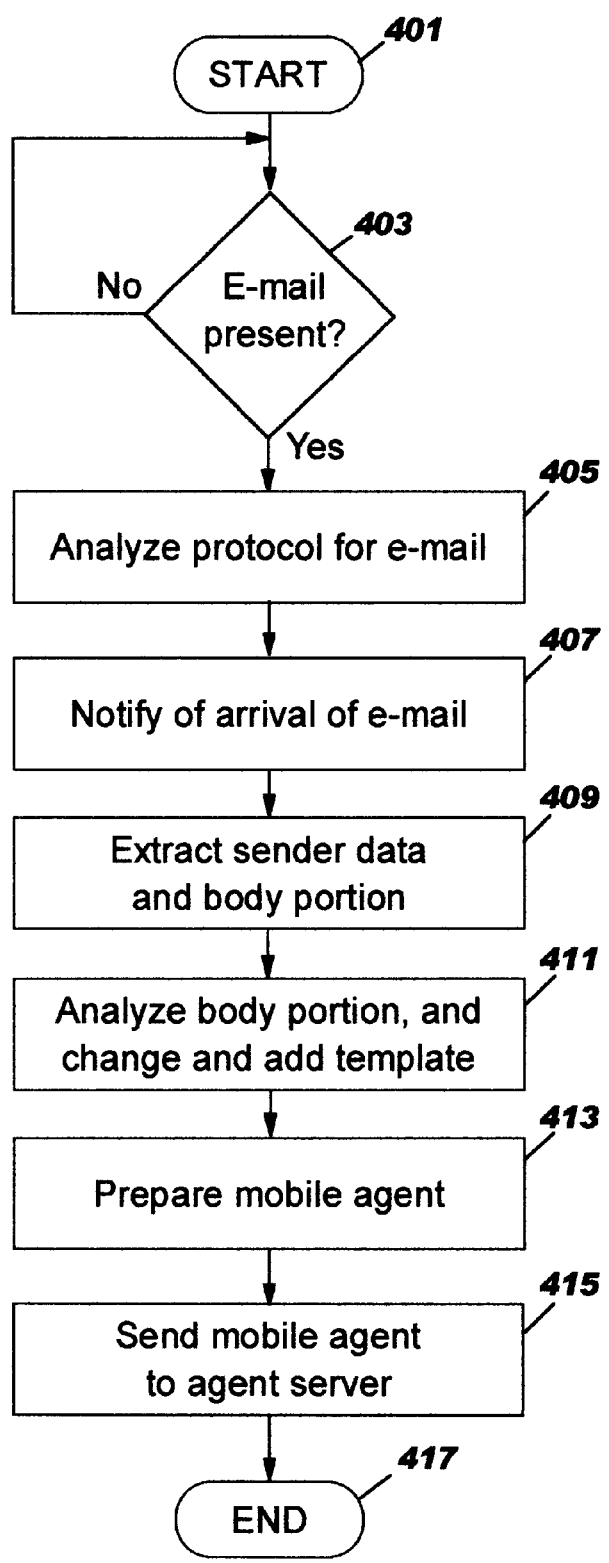
FIG. 11 is a flowchart showing the processing performed, from the time an e-mail is received until a mobile agent is sent, according to the embodiment of the present invention.

The sequential processing performed in the embodiment from the time an e-mail is received until a mobile agent is generated and sent will now be described while referring to the functional block diagram for the mail proxy 300 in FIG. 3 and a flowchart in FIG. 11.

The protocol engines 311 and 321 of the mail proxy 300 monitor the arrival of e-mail (block 403). The necessary protocols for the e-mail, which are sent from the terminals 211 and 213, are analyzed and processed by the protocol engines 311 and 321, and in this manner, files having the e-mail form are generated.

The protocol engines 311 and 321 notify the main handlers 313 and 323 of the arrivals of the e-mail (block 407). Upon receipt of this notification, the main handlers 313 and 323 extract information for senders and the body portions of the mail (block 409). When a return receiver is fixed, or a return receiver that is already registered is employed, the information for the sender does not need to be extracted.

The main handlers 313 and 323 send the extracted body portions of the mail and the extracted sender information via the mail API 330 to the mail interpreter 341. In the preferred embodiment of the present invention, the protocol engines 311 and 321 perform authentication before receiving mail from terminal 1. At this time, the password (DSPPASS1) that corresponds to the phone number (050-123-4567) of the terminal 1 is employed to determine whether it is registered in the subscriber table 349 of the configuration 345.

Following this, the mail interpreter 341 of the mail proxy 300 receives the mail and analyzes the contents of the mail keyword written in the body portion (block 411). At this time, based on the mail keyword, alteration, addition or deletion of the contents of a template designated with #TEMPLATE is performed.

Assuming the contents of registered template SEND-MAIL are shown in Table 8 below,

TABLE 8

Name=Agent1
Feature=HostACC
Program=g:\mail\sendmail.exe
ProgramType=W32EXE
ProgramLocation=REMOTE
ProgramArgs=JL07457
ResultHandling=NONE
Capability=<host1t1>
ReplyReceiverID=OS2CLN In accordance with the agent mail keyword for the e-mail in Table 7, the contents of the file for the template, which is designated by #TEMPLATE as the analysis results of the mail proxy 300, are changed as follows.

TABLE 9

Name=Agent1
Destination=SRV
DestinationType=NAME
Feature=HostACC
Program=g:\mail\sendmail.exe
ProgramType=W32EXE
ProgramLocation=REMOTE
ProgramArgs=JL03320
ResultHandling=AUTORETURN
Capability=<host1t1>
ReplyReceiverID=PROXY1

As is clearly apparent, "Destination=SRV" and "DestinationType=NAME" are added to Table 8, and "ProgramArgs=JL03320," "ResultHandling= AUTORETURN" and "ReplyReceiverID=PROXY1" are changed.

The agent sender 343 receives the new template, and based on this template, prepares the mobile agent 240 by using the client API 360 (block 413). Although the method for generating a mobile agent using a template is well known to one having ordinary skill in the art, in this embodiment, a mobile agent is generated by updating the class or the property of an object oriented program that serves as a pattern.

In this embodiment, the object oriented program that serves as a pattern is employed as an object for generating various agents. The idea of the present invention is not limited to this, and an object oriented program can be an ordinary one or a program that is not object oriented. In this case, an execution module can be newly generated by updating the class or the property of the object oriented program or by updating the source code, or a program that is changed based on the mail keyword can be executed by directly updating the execution module.

In the present exemplary embodiment, based on the sender information obtained from the mail API 330, the agent sender 343 acquires a user ID, which is registered in the agent server 230, and a password for it from the user registration in the subscriber table 349, and adds the user ID and the password to the prepared mobile agent.

To send the mobile agent to the agent server 230, from the telephone number (050-123-4567) of terminal 1, the mail proxy 300 employs DSPO1 as the user ID for the agent server 230, and DSPPASS1 as a password. The agent server 230 employs the user ID (DSPO1) and the password (DSPPASS1), which are registered when the system is built, to determine whether or not a user has been registered in the agent server 230.

The generated mobile agent 240 is sent by the agent sender 343 via the client API 360. The request from the client API 360 is processed by the client agent manager 370, and a mobile agent is sent to a designated agent server (block 415). In this embodiment, since "SRV" is designated, the mobile agent is sent to the agent server 230. Although in this embodiment the agent server 230 is present in the same machine as is the mail proxy 300, an agent server present in another machine connected to the network can be designated.

Handling the Results Obtained by Processing an Object

Figure 12:
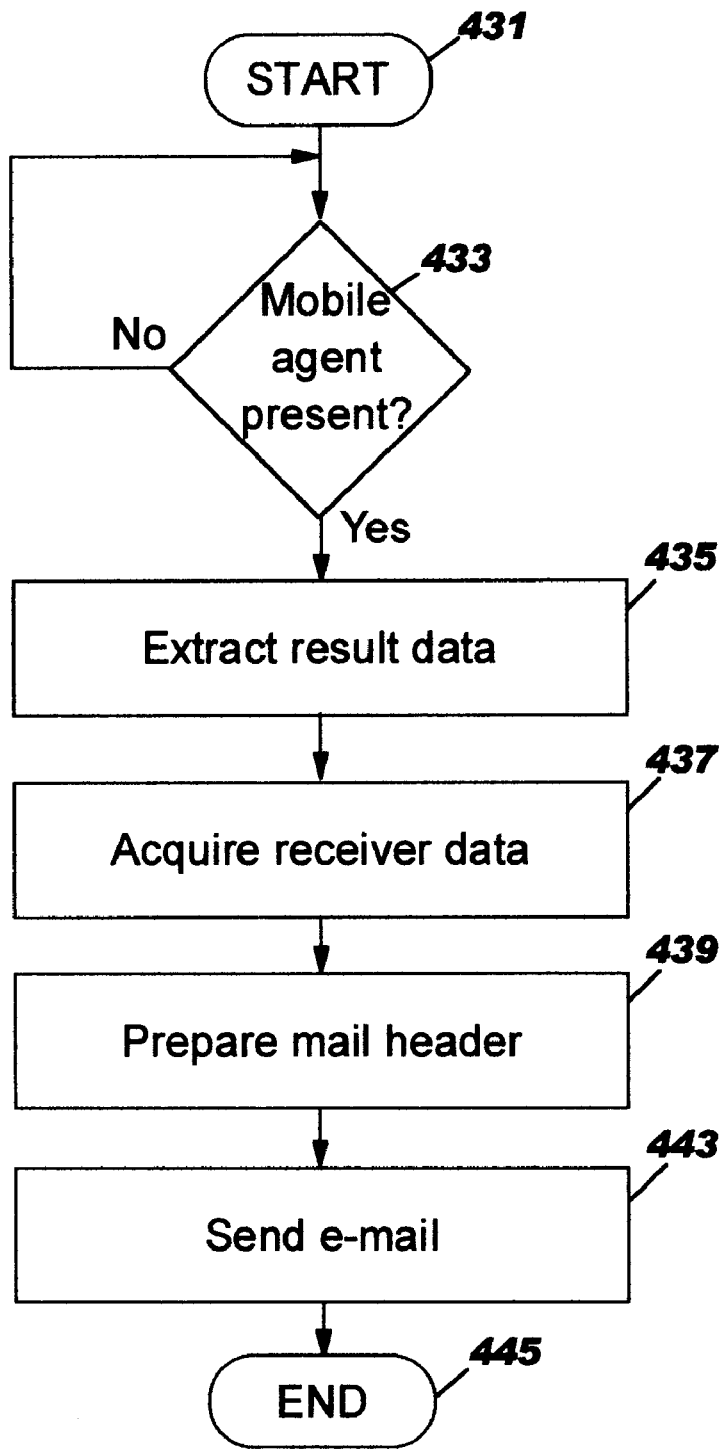
FIG. 12 is a flowchart showing the processing performed, from the time processing results included in a mobile agent are received until an e-mail is sent, according to the embodiment of the present invention.
Figure 13:
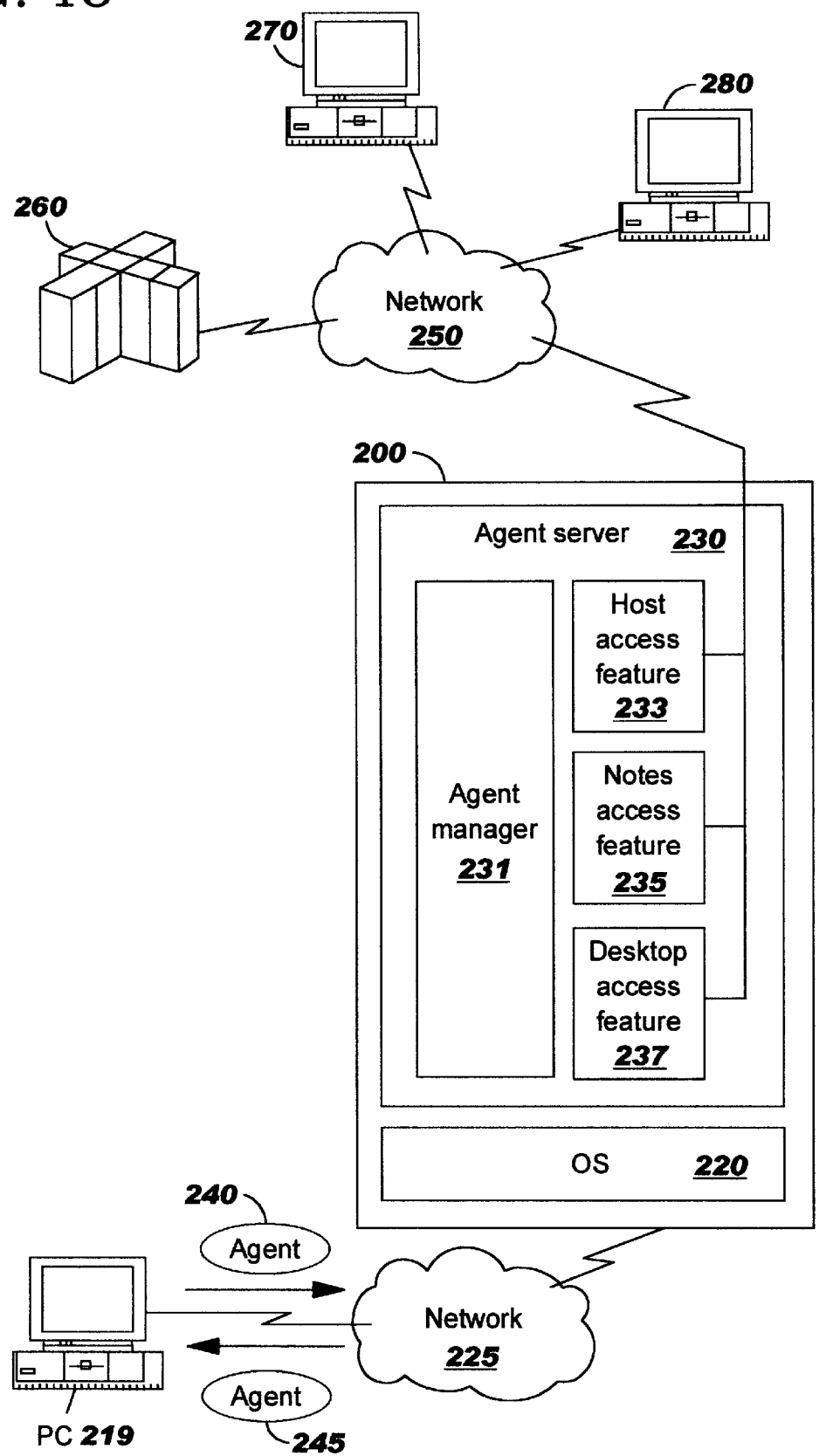
FIG. 13 is a conceptual diagram showing the operating state of a conventional agent processing system.

The sequential processing performed from the time the results obtained by processing the mobile agent are received until an e-mail is sent will now be explained while referring to the functional block diagram of the mail proxy 300 in FIG. 3 and a flowchart in FIG. 12.

The agent server 230 processes a received mobile agent 240. In accordance with the contents of a program executed by the mobile agent, a file in a host system 260, in a database 270 for the Lotus Notes, or on the hard disk of the server 200 is accessed to obtain a data file that includes processing results.

When the data including processing results are available, the agent server 230 prepares a mobile agent 245 in which the results are included, and sends it to the mail proxy 300. The client agent manager 370 of the mail proxy 300 waits until the mobile agent 245 that includes the results is received.

When the mobile agent 245 that includes the results of the job is sent by the agent server 230 to the client agent manager 370, the mobile agent 245 is temporarily stored in the queue of the client agent manager 370. The agent monitor 353 periodically examines the queue of the client agent manager 370 by employing the client API 360 to determine whether or not a mobile agent is present (block 433).

When the mobile agent 245 including the results of the job is present, the mail sender 355 extracts, from the mobile agent 245, data that serves as the body portion of the mail and that indicates the results (block 435). At this time, an alias, which is the return address for terminal 2 is acquired from the mobile agent 245, and based on the alias, the phone number of terminal 2 is obtained from user registration in the subscriber table 349 (block 437).

The body portion and the phone number data are sent via the mail API 330 to the mail handlers 310 and 320. The data that serves as the body portion of an e-mail can be changed so that it can be easily handled by the terminal. For example, it is possible to translate data, to change the layout of data, to extract only the essential portion of a document, such as a headline, or to delete data if the quantity of the data exceeds a specific value, or to divide the data and send the head data to a designated destination and the remaining data to a substitute destination. In addition, the data can be changed not to an e-mail but to a voice signal or a FAX signal, which is sent to a designated destination.

The main handlers 313 and 323 acquire, from the mail sender 355, the return phone number of terminal 2 and the body portion of an e-mail. Then, the main handlers 313 and 323 prepare the header for an e-mail and add it to the body portion to provide an e-mail (block 439). In this case, mail destination phone number "050-234-5678" is employed according to a mail keyword designated as "#RECEIVER= PROXY1," and "DSPPASS3" is used for authentication. The protocol engines 311 and 321 change the e-mail to the protocol as necessary and send the e-mail to the terminal 2 (block 443).

An explanation has been given for the present invention using an e-mail system. Since the present invention can be accomplished when the mail proxy 300 acquires a mail keyword, if, instead of the mail processing function, a well known voice identification function or a voice synthesis function is provided for the mail proxy 300, the present invention can be implemented not with an e-mail but with a telephone. In this case, only the mail handlers 310 and 320 need be altered. That is, only a function for analyzing a voice signal that is input across a telephone line and for extracting a body portion including a mail keyword, and a function for synthesizing sound with the processing results and sending the synthesized data when the results are returned to a terminal need be provided for the mail handlers 310 and 320.

Similarly, the present invention can be accomplished not with an e-mail but with a facsimile by providing, instead of the mail processing function, a well known character recognition function and a FAX sending function for the mail proxy 300. In this case also, only the mail handlers 310 and 320 need be changed. In other words, only a function for analyzing a FAX signal input across a telephone line and for extracting a body portion including a mail keyword, and a function for converting process results into a FAX signal when the results are returned to a terminal need be provided for the mail handlers 310 and 320.

Thus, the present invention utilizes a generic message which may be generated without any special software to remotely control a processing system. As is evident from the above discussion, this generic message may be an e-mail and voice message or a facsimile message. The benefits of the present invention are provided by any generic message which may include the information regarding its source and the information utilized to control the remote processing system (e.g. the keywords and values discussed above) and which may be readily generated by a user without the need for special software.

In the drawings and specification, there have been disclosed typical preferred embodiments of the invention and, although specific terms are employed, they are used in a generic and descriptive sense only and not for purposes of limitation, the scope of the invention being set forth in the following claims.

That which is claimed is:

1. A method of remote control of a remote processing system, the method comprising:

receiving a generic message from a message source;

extracting from the generic message a source and instructions describing the control of the remote processing system;

using the extracted instructions to modify a previously defined template specifying how messages from the message source are processed;

controlling the remote processing system in a manner specified by the previously defined template as modified by the instructions extracted from the generic message so as to provide processing results.

2. A method according to claim 1, further comprising generating a generic message containing the processing results; and transmitting the generic message containing the processing results to the source of the generic message.

3. A method according to claim 1, wherein the generic message comprises an e-mail message.

4. A method according to claim 3, wherein said step of extracting comprises:

analyzing the header information of the e-mail to extract the source of the e-mail; and analyzing the body portion of the e-mail to extract keywords and parameters describing the control of the remote processing system.

5. A method according to claim 2, wherein the generic message comprises an e-mail message and wherein said step of generating a generic message containing the processing results comprises generating an e-mail containing the processing results and wherein said step of transmitting the generic message comprises transmitting the e-mail containing the processing results.

6. A method of remote control of a remote processing system, the method comprising:

receiving an e-mail message from a message source;

analyzing the header information of the e-mail to extract the source of the e-mail;

analyzing the body portion of the e-mail to extract keywords and parameters describing the control of the remote processing system;

generating a mobile agent according to the extracted information; and controlling the remote processing system by executing the mobile agent to obtain the processing results.

7. A method according to claim 6, wherein said extracted information comprises agent template specification and agent template change information and wherein said step of generating a mobile agent comprises:

selecting an agent generation template based on the agent template specification information extracted from the message;

modifying the selected agent generation template based on the agent template change information extracted from the message so as to provide a modified agent generation template; and generating the mobile agent according to the modified agent generation template.

8. A method according to claim 6, further comprising:

transmitting the mobile agent to an agent server associated with the mobile agent; and receiving results of the execution of the mobile agent from the agent server to provide the processing results.

9. A method according to claim 8, further comprising:

generating an e-mail message containing the processing results; and transmitting the e-mail message containing the processing results to the source of the generic message.

10. A method according to claim 1, wherein the generic message comprises a voice message.

11. A method according to claim 10, wherein said extracting step comprises the step of utilizing voice recognition software to recognize information in the voice message from which the source of the message and the instructions describing the control of the remote processing system may be extracted.

12. A method according to claim 10, further comprising:

generating a voice message containing the processing results; and transmitting the voice message containing the processing results to the source of the generic message.

13. A method according to claim 1, wherein the generic message comprises a facsimile message.

14. A method according to claim 13, wherein said extracting step comprises the step of utilizing optical character recognition software to recognize information in the facsimile message from which the source of the message and the instructions describing the control of the remote processing system may be extracted.

15. A method according to claim 13, further comprising:

generating a facsimile message containing the processing results; and transmitting the facsimile message containing the processing results to the source of the generic message.

16. A system for providing remote control operation of a processor, the system comprising:

a mail proxy having a mail handler, wherein said mail proxy generates a mobile agent from data in a generic message received from a message source from source and control information extracted by the mail handler from the received generic message; and an agent server, operably associated with the mail proxy, which processes the mobile agent so as to provide processing results associated with the mobile agent.

17. A system according to claim 16, wherein the mail server further provides the processing results to the mail proxy and wherein said mail proxy further generates a generic message containing the processing results for transmission to the message source.

18. A system according to claim 17, wherein the mail proxy further comprises:

an agent sender which generates a mobile agent in response to a received generic message from the mail handler;

a client agent manager which executes the mobile agent and which provides processing results corresponding to the mobile agent.

19. A system according to claim 18, wherein the extracted control information comprises agent template information and agent template change information and wherein the mail interpreter selects a previously stored agent template based on the agent template information and modifies the selected agent template based on the agent template change information to provide an agent generation template; and wherein the agent sender generates the mobile agent based on the agent generation template.

20. A system for remote control of a processing system, comprising:

means for receiving a generic message from a message source;

means for extracting from the generic message a source and instructions describing the control of the remote processing system;

means for using the extracted instructions to modify a previously defined template specifying how messages from the message source are processed; and means for controlling the remote processing system in a manner specified by the previously defined template as modified by the instructions extracted from the generic message so as to provide processing results.

21. A system according to claim 20, further comprising:

means for generating a generic message containing the processing results; and means for transmitting the generic message containing the processing results to the source of the generic message.

22. A system according to claim 20, wherein the generic message comprises an e-mail message.

23. A system according to claim 22, wherein said means for extracting comprises:

means for analyzing the header information of the e-mail to extract the source of the e-mail; and means for analyzing the body portion of the e-mail to extract keywords and parameters describing the control of the remote processing system.

24. A system according to claim 21, wherein the generic message comprises an e-mail message and wherein said means for generating a generic message containing the processing results comprises means for generating an e-mail containing the processing results and wherein said means for transmitting the generic message comprises means for transmitting the e-mail containing the processing results.

25. A system for remote control of a processing system, comprising:

means for receiving an e-mail message from a message source;

means for analyzing the header information of the e-mail to extract the source of the e-mail;

means for analyzing the body portion of the e-mail to extract keywords and parameters describing the control of the remote processing system;

means for generating a mobile agent according to the extracted information; and means for controlling the remote processing system by executing the mobile agent to obtain the processing results.

26. A system according to claim 25, wherein said extracted information comprises agent template specification and agent template change information and wherein said means for generating a mobile agent comprises:

means for selecting an agent generation template based on the agent template specification information extracted from the message;

means for modifying the selected agent generation template based on the agent template change information extracted from the message so as to provide a modified agent generation template; and means for generating the mobile agent according to the modified agent generation template.

27. A system according to claim 25, further comprising:

means for transmitting the mobile agent to an agent server associated with the mobile agent; and means for receiving results of the execution of the mobile agent from the agent server to provide the processing results.

28. A system according to claim 27, further comprising:

means for generating an e-mail message containing the processing results; and means for transmitting the e-mail message containing the processing results to the source of the generic message.

29. A system according to claim 20, wherein the generic message comprises a voice message.

30. A system according to claim 29, wherein said means for extracting comprises means for utilizing voice recognition software to recognize information in the voice message from which the source of the message and the instructions describing the control of the remote processing system may be extracted.

31. A system according to claim 29, further comprising:

means for generating a voice message containing the processing results; and means for transmitting the voice message containing the processing results to the source of the generic message.

32. A system according to claim 20, wherein the generic message comprises a facsimile message.

33. A system according to claim 32, wherein said means for extracting comprises means for utilizing optical character recognition software to recognize information in the facsimile message from which the source of the message and the instructions describing the control of the remote processing system may be extracted.

34. A system according to claim 32, further comprising:

means for generating a facsimile message containing the processing results; and means for transmitting the facsimile message containing the processing results to the source of the generic message.

35. A computer program product for remote control of a processing system, comprising:

a computer readable storage medium having computer-readable program code means embodied in said medium, said computer-readable program code means comprising:

computer-readable program code means for receiving a generic message from a message source;

computer-readable program code means for extracting from the generic message a source and instructions describing the control of the remote processing system;

computer-readable program code means for using the extracted instructions to modify a previously defined template specifying how messages from the message source are processed; and computer-readable program code means for controlling the remote processing system in a manner specified by the previously defined template as modified by the instructions extracted from the generic message so as to provide processing results.

36. A computer program product according to claim 35, further comprising:

computer-readable program code means for generating a generic message containing the processing results; and computer-readable program code means for transmitting the generic message containing the processing results to the source of the generic message.

37. A computer program product according to claim 35, wherein the generic message comprises an e-mail message.

38. A computer program product according to claim 37, wherein said computer-readable program code means for extracting comprises:

computer-readable program code means for analyzing the header information of the e-mail to extract the source of the e-mail; and computer-readable program code means for analyzing the body portion of the e-mail to extract keywords and parameters describing the control of the remote processing system.

39. A computer program product according to claim 36, wherein the generic message comprises an e-mail message and wherein said computer-readable program code means for generating a generic message containing the processing results comprises computer-readable program code means for generating an e-mail containing the processing results and wherein said computer-readable program code means for transmitting the generic message comprises computer-readable program code means for transmitting the e-mail containing the processing results.

40. A computer program product for remote control of a processing system, comprising:

a computer readable storage medium having computer-readable program code means embodied in said medium said computer-readable program code means comprising:

computer-readable program code means for receiving an e-mail message from a message source;

computer-readable program code means for analyzing the header information of the e-mail to extract the source of the e-mail;

computer-readable program code means for analyzing the body portion of the e-mail to extract keywords and parameters describing the control of the remote processing system;

computer-readable program code means for generating a mobile agent according to the extracted information; and computer-readable program code means for controlling the remote processing system by executing the mobile agent to obtain the processing results.

41. A computer program product according to claim 40, wherein said extracted information comprises agent template specification and agent template change information and wherein said computer-readable program code means for generating a mobile agent comprises:

computer-readable program code means for selecting an agent generation template based on the agent template specification information extracted from the message;

computer-readable program code means for modifying the selected agent generation template based on the agent template change information extracted from the message so as to provide a modified agent generation template; and computer-readable program code means for generating the mobile agent according to the modified agent generation template.

42. A computer program product according to claim 40, further comprising:

computer-readable program code means for transmitting the mobile agent to an agent server associated with the mobile agent; and computer-readable program code means for receiving results of the execution of the mobile agent from the agent server to provide the processing results.

43. A computer program product according to claim 42, further comprising:

computer-readable program code means for generating an e-mail message containing the processing results; and computer-readable program code means for transmitting the e-mail message containing the processing results to the source of the generic message.

44. A computer program product according to claim 35, wherein the generic message comprises a voice message.

45. A computer program product according to claim 44, wherein said computer-readable program code means for extracting comprises computer-readable program code means for utilizing voice recognition software to recognize information in the voice message from which the source of the message and the instructions describing the control of the remote processing system may be extracted.

46. A computer program product according to claim 44, further comprising:

computer-readable program code means for generating a voice message containing the processing results; and computer-readable program code means for transmitting the voice message containing the processing results to the source of the generic message.

47. A computer program product according to claim 45, wherein the generic message comprises a facsimile message.

48. A computer program product according to claim 47, wherein said computer-readable program code means for extracting comprises computer-readable program code means for utilizing optical character recognition software to recognize information in the facsimile message from which the source of the message and the instructions describing the control of the remote processing system may be extracted.

49. A computer program product according to claim 47, further comprising:

computer-readable program code means for generating a facsimile message containing the processing results; and computer-readable program code means for transmitting the facsimile message containing the processing results to the source of the generic message.

* * * * *